Dec. 31, 1963  D. B. HARRINGTON ETAL  3,116,429
COOLING ARRANGEMENT FOR THE STATOR TEETH
OF A DYNAMOELECTRIC MACHINE
Filed April 2, 1962
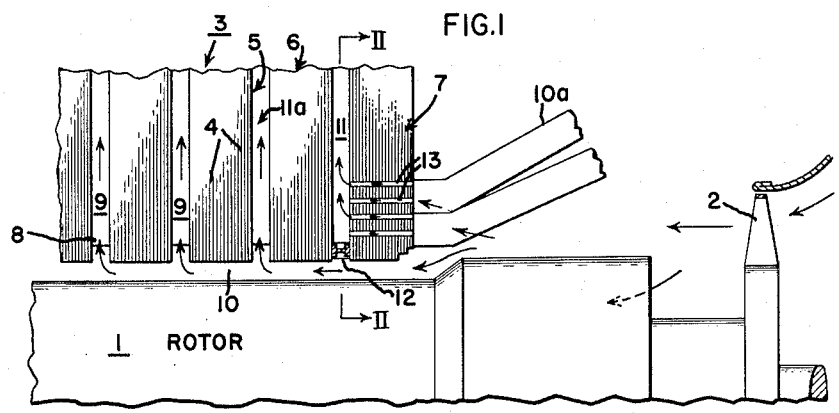
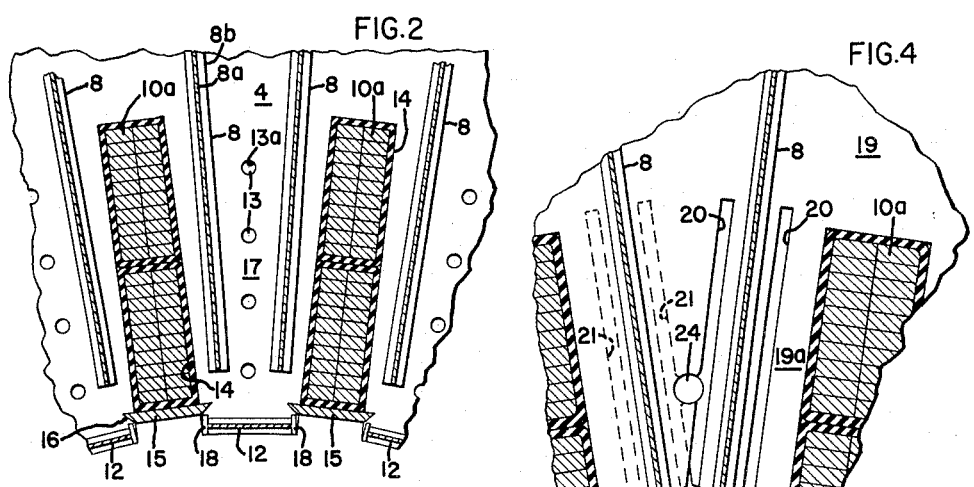
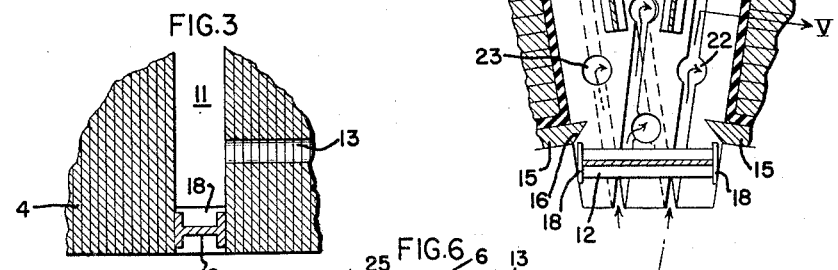
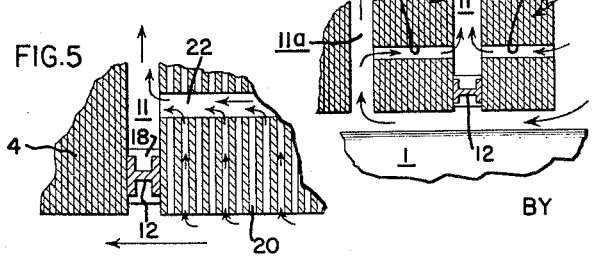
INVENTORS:
DEAN B. HARRINGTON,
PETER A. BECKER,
BY W. C. Crutcher
THEIR ATTORNEY.

3,116,429
COOLING ARRANGEMENT FOR THE STATOR
TEETH OF A DYNAMOELECTRIC MACHINE
Dean B. Harrington, Schenectady, N.Y., and Peter A.
Becker, Frankfurt am Main Hochst, Germany,
assignors to General Electric Company, a corporation
of New York
Filed Apr. 2, 1962, Ser. No. 184,188
6 Claims. (Cl. 310—64)

This invention relates to an improved arrangement for reducing the temperature in the stator teeth of a dynamoelectric machine and more particularly to an improved arrangement for cooling the end stator teeth in a dynamoelectric machine which is cooled by radial flow of gas between axially spaced packages of laminations.

Dynamoelectric machines, such as large turbine generators, which are cooled by a gas such as hydrogen flowing radially between spaced packages or groups of stator laminations, are well known. While the windings themselves may or may not additionally be cooled by a gas or a liquid flowing within the insulation of the winding, the radial gas flow between lamination packages serves to carry off the heat produced in the laminations due to eddy current and hysteresis losses. The heat generated in the "teeth" of the stator laminations, which are the radially extending portions between the winding slots, is particularly difficult to remove. The problem is even more severe in the endmost packages of laminations on each end of the machine, due to the added longitudinal end leakage flux.

It has been suggested that the structural members holding the end package of laminations might be cooled by pumping gas the length of the machine by a high differential pressure fan and then causing it to flow through radial grooves in the structural member and across the surface of the very last lamination. Such an arrangement is not feasible in a radial flow machine which uses relatively low fan differential pressures. Other proposed arrangements employing axial flow passages along the entire length of the machine through the laminations using no radial ducts also require relatively high fan pressures.

Accordingly, one object of the present invention is to provide an improved arrangement for cooling the stator teeth of a dynamoelectric machine, particularly in the end lamination packages.

Another object of the invention is to reduce the eddy current losses in the stator teeth of the end packages of laminations in a dynamoelectric machine with radial flow gas cooling.

Another object of the invention is to provide an improved means for reducing eddy current losses in the end lamination packages while at the same time providing increased cooling therefor.

These and other objects of the invention will become apparent from the following description taken in connection with the accompanying drawing in which:

FIG. 1 is an elevation drawing, partly in section, of portions of a radial-flow gas-cooled dynamoelectric machine;

FIG. 2 is an axial view through a portion of the generator stator taken along lines II—II of FIG. 1;

FIG. 3 is an enlarged view of a portion of FIG. 1 showing details of the flow-restricting member between lamination packages;

FIG. 4 is an axial view of a modified stator tooth similar to FIG. 2;

FIG. 5 is a view of the modified tooth taken in a circumferential direction along lines V—V of FIG. 4, and FIG. 6 is a view similar to FIG. 5 showing another modification of the invention.

Briefly stated, the invention is practiced by substantially blocking off one or more radial ducts near the ends of a radial flow, gas-cooled dynamoelectric machine, and by providing axial ducts in the end lamination packages leading to the radial ducts thus isolated, so that the gas is subdivided into several small streams which promote increased cooling of the end stator teeth. A modified form of the invention employs slits running along the stator teeth, which may be diagonal and arranged in alternating directions in alternate laminations, to provide strength. The slits reduce eddy current losses and also augment the axial ducts with additional gas flow in the very tips of the stator teeth.

Referring now to FIG. 1 of the drawing, a generator rotor 1 journaled in bearings (not shown) includes a fan 2 disposed thereon to circulate a gaseous coolant, such as hydrogen, through rotor 1 and through the generator stator core indicated generally as 3. Stator core 3 comprises a number of thin laminations 4 which are grouped in packages designated as 5, 6, 7. Laminations 4 are generally made of metal stampings and extend over several stator teeth. The packages of laminations 5, 6, 7 are axially spaced by radially extending separators 8 to provide a number of radial flow ducts 9. The cooling gas from the discharge end of fan 2 is circulated into the air gap 10 and then flows radially outward through radial ducts 9 to cool the packages of laminations 5, 6, 7. Of course, in some applications the direction of gas flow may be the reverse of that described, with cold gas flowing radially inward through ducts 9.

The windings 10a may also be cooled by the radial gas flow or they may be separately internally cooled by means of a gas or liquid, as may be seen, for example, in U.S. Patent 2,695,368 issued in the name of C. E. Kilbourne on November 23, 1954, and assigned to the assignee of the present application.

The cooling gas from radial ducts 9 then passes through coolers (not shown) and is recirculated through ducts in the casing, back to the intake side of fan 2, in a continuous circuit. The other end of the generator may be cooled by fans similar to 2, and the central portion of the stator may be cooled by radial inward and outward flow as may be seen by reference to the aforementioned Kilbourne patent. Inasmuch as the flow is radial through a large number of ducts, the pressure differential across fan 2 is relatively low.

The foregoing description relates to conventional gas-cooled radial flow dynamoelectric machines and is well known. However, with such a construction, the end packages of laminations, such as the one designated as 7, are subjected to greater eddy current losses due to end leakage flux, and the temperature in this package can become quite high, unless adequate cooling is provided.

In accordance with the invention, the last radial duct 11 is substantially blocked or entry is greatly restricted thereto by means of a flow restricting member 12 near the ends of the stator teeth. A group of axial flow passages 13 of relatively small cross section is provided in the teeth of lamination package 7 leading to the blocked duct 11. Since duct 11 is connected through the coolers (not shown) to the inlet side of fan 2, the pressure differential across the relatively small cross-sectional axial ducts 13 causes several closely spaced streams of gas to flow through the ducts. This promotes increased cooling due to the fact that the gas is scrubbing all the laminations in the package. However, since the ducts are relatively short and extend only through the axial length of one lamination package, excessive fan pumping power is not required to force the gas through the ducts 13.

Reference to FIG. 2 of the drawing, which is a view taken through radial duct 11, shows that the laminations 4 in the package 7 have a number of holes 13a punched therein which provide the axial passages 13 when the laminations are aligned. Laminations 4 also are punched with rectangular openings which, when aligned together, provide winding slots 14 in which are disposed the conductor bars 10a. The conductor bars are held in place by wedges 15 which are driven axially through suitable V-shaped grooves 16 cut in laminations 4.

The radial spacer members 8 separating lamination packages may be of any suitable shape which will not obstruct the radial flow of gas, and are preferably of an I-shaped cross-section, and can be attached by spot welding, for example, to the end lamination of a package. Fig. 2 is taken through the web 8a of the spacer 8, with the flange 8b of the spacer seen beyond.

The portions of the laminations left between winding slots 14 are termed the stator "teeth" designated as 17. In most of the radial ducts, such as duct 9 of FIG. 1, flow of the gas takes place across the surface of the laminations to cool them by combined convection and conduction through the stator metal. As seen in FIG. 2, however, flow through the end duct 11 is blocked by the flow-restricting member 12, which may suitably be of I-shaped cross-section similar to that of spacers 8. Members 12 may be spot welded or otherwise suitably secured to the last lamination in the package near the ends of stator teeth 17. The flow-restricting members 12 may have small end pieces 18 attached thereto to close off each end of the I-section. Closure pieces 18 are located closely adjacent to the edges of wedges 15. Therefore, the flow-restricting members 12 prevent or substantially restrict the radial flow of gas through duct 11 between the circumferentially spaced conductor bars 10a. An absolute blockage of radial gas flow is not essential, the only requirement being that the flow is significantly restricted so that gas is induced to flow through the axial ducts 13.

Additional details of the flow-restricting member 12 with its end closure pieces 18 may be seen by reference to FIG 3, which is an enlarged view. There it can be seen that the cross-section of the flow-restricting member 12 is I-shaped similar to the radial spacers 8, although it is of course understood that flow restricting member 12 could be a channel, a solid plastic member, or any other shape, so long as it would suitably restrict the flow of gas through the end radial ducts 11.

A modified form of the invention may be seen by reference to FIGS. 4 and 5. There the end lamination 19 and odd-numbered laminations beyond are provided with diagonal slits 20 extending along the stator tooth 19a. The next lamination beneath and even-numbered laminations beyond are provided with slits 21 slanting diagonally in the opposite direction and indicated by dotted lines. Slits 20 and 21 are asymmetrically located with respect to the centerline of tooth 19a for each particular lamination. Spacer members 8, the flow-restricting member 12, and its end closure pieces 18, are designated with the same reference numerals as before and perform the same functions.

Also provided in the laminations are circular holes, such as hole 22 formed along the slit 20, and a circular hole 23 which is not located along a slit but which is symmetrically disposed with respect to hole 22. The underlying lamination, which is slit in the opposite direction, as at 21, will have similar holes which are also symmetrically disposed. However, hole 23 in the underlying lamination will be formed as a part of the slit 21, whereas hole 22 will not be on a slit. In other words, symmetrically disposed holes 22, 23 will be aligned to provide axial passages through the lamination package, whereas the asymmetrically disposed slits in alternate laminations fall in opposite directions to reinforce the tooth. Slits 20, 21 reduce the eddy current losses in stator teeth 19a, but inasmuch as they are disposed in alternating fashion, the lamination package will not be weakened substantially by the presence of slits 20, 21, since they are held between solid metal portions of adjacent laminations. Additional partial holes, such as that indicated at 24, may be formed as a part of a slit which, when matched with a symmetrically-disposed partial hole on an underlying slit will provide a circular axial conduit through the lamination package. Holes 24 are located on the centerline of the stator tooth.

As mentioned previously, the eddy current losses in the stator teeth, particularly in the end lamination package, cause excessive temperatures, which in some cases may be higher near the inner ends of the stator teeth. The slits 20, 21 cooperate to both reduce the eddy current losses by interrupting the magnetic flux path and, in addition, augment the cooling action as may be seen by reference to FIG. 5. FIG. 5 indicates that alternating slits 20 provide very small cross-section radial passages near the tips of the stator teeth, which connect with the axial passage formed by holes 22. As mentioned previously, gas is flowing through axial ducts 22, 23, etc. to provide increased cooling of the end lamination packages. However, this cooling flow is augmented by additional gas flowing radially through the very tiny passages provided by slits 20, 21 into the axial passages 22, 23, and thence to radial duct 11 as indicated by the arrows. It should be apparent that the radial passages provided by slits 20, 21 will be most effective in the very tip of the stator tooth 19a, since there will be little tendency for the gas to flow radially past the first axial escape passage 22 which it encounters.

FIG. 6 shows another modification which provides increased cooling for the two end packages 6, 7. The same reference numerals are used as in the previous figures for like members. However, additional axial ducts 25 are provided in the next to the last lamination package 6. These are fed by a portion of the gas flowing radially in duct 11a. Ducts 25 will generally receive less gas than ducts 13. However the need for cooling in the package 6 is less than that in end package 7.

The operation and advantages of the invention will be apparent from the following description. In the more basic arrangement of FIGS. 1 through 3, gas flowing radially from the relatively low-pressure fan 2 serves to adequately cool lamination packages such as 5 in the interior of the generator. However, in the end lamination package, which is subjected to greater heating, the blocked flow passage 11 acting in conjunction with the axial flow passages 13 provides several closely spaced streams of gas flowing through passages 13. These serve to carry off additional heat and provide more effective cooling of the lamination package 7, since the distance for heat conduction through the laminations is shorter. Also, every lamination is contacted by the gas streams.

In the modification of FIGS. 4 and 5, the same basic procedure is followed, with the additional use of diagonal asymmetrical slits lying in alternating directions, which reduce eddy current losses in the teeth. The slits also cooperate to provide additional small streams of radially flowing gas near the very tips of the stator teeth, augmenting the gas flow through the axial passages shown in the basic arrangement of FIGS. 1–3.

It will be apparent to those skilled in the art that the slits 20, 21 of FIGS. 4 and 5 need not appear in every lamination as shown, but can be employed in every third or fourth lamination, for example. It will also be apparent that the invention is not limited to the last lamination package 7 of FIG. 1, but could be extended to package 6 by employing a modification similar to that of FIG. 6. However, the invention is most effective where the axial passages 13 are relatively short for use with the low-pressure fans ordinarily used in radial flow gas-cooled machines.

While there has been described what is at present considered to be the preferred embodiment of the invention and a modification thereof, it is desired to cover in the appended claims all such modifications as fall within the true spirit and scope of the invention.

What we claim as new and desire to secure by Letters Patent of the United States is:

1. In a dynamoelectric machine, the combination of:

a plurality of laminations defining a slotted stator core having radially extending teeth, said laminations being grouped in axially spaced packages defining radial cooling ducts therebetween, a rotor defining an air gap with said core, means supplying cooling gas to said radial ducts from said air gap and from the end of said stator core, means substantially blocking the radial flow of gas into selected radial ducts disposed between the last two packages of laminations at the end of said stator core, said laminations in the end lamination package together defining a plurality of axial flow passages in the stator teeth which connect said selected radial ducts with the end of the stator core, whereby gas flowing through the axial passages in the end lamination package in contact with the laminations provides additional cooling for the end lamination package.

2. In a dynamoelectric machine, the combination of:

a plurality of laminations forming a stator core and defining winding slots with radially extending teeth therebetween, a plurality of spacer means separating groups of laminations into axially-spaced packages to define radial cooling ducts therebetween, a stator winding disposed in said slots and having wedges cooperating with said stator teeth to retain the windings in the slots, a plurality of flow-restricting members disposed near the ends of said stator teeth and extending circumferentially between wedges and disposed between the last two packages of laminations on the end of said stator core, said wedges and said flow-restricting means cooperating to significantly restrict the radial flow of gas to the endmost group of radial ducts, means supplying cooling gas from the end of the stator core to said radial cooling ducts, said laminations in the endmost lamination package defining a plurality of axial flow passages in the stator teeth, whereby gas flowing through said axial passages provides additional cooling of the end lamination package.

3. In a dynamoelectric machine, the combination of:

a plurality of laminations defining a slotted stator core having radially extending teeth, said laminations being grouped in axially-spaced packages defining radial cooling ducts therebetween, means supplying cooling gas to said radial ducts from the end of the stator core, means restricting the radial flow of gas into selected radial ducts located between the two endmost packages of laminations on the stator core, said laminations in the endmost lamination package defining a plurality of symmetrically disposed holes, and selected laminations of the end package laminations also defining narrow asymmetrically disposed slits extending to the ends of the stator teeth and connecting with selected holes, said end package laminations being arranged in alternating fashion so that said symmetrically disposed holes are aligned to provide axial flow passages while said asymmetrically disposed slits are not aligned, whereby gas flowing through said axial flow passages provides additional cooling for the end lamination package while said slits further augment the additional cooling by feeding said axial passages from the tips of said stator teeth while also reducing eddy current losses in the stator teeth.

4. A lamination for a dynamoelectric machine stator core comprising a metal stamping having a plurality of converging tooth portions defining open rectangular recesses therebetween, each of said tooth portions defining at least one narrow slit disposed diagonally with respect to the centerline of the tooth portion and open at the end of the tooth portion, each of said tooth portions also defining a first opening formed along said slit and wider than the slit width, whereby said slit provides a flow passage from the end of the tooth portion to said opening while reducing eddy current losses in the tooth portion.

5. The lamination according to claim 4 wherein said slit crosses the centerline of said tooth portion and said first opening is located on the centerline, whereby laminations may be stacked in alternating fashion to cause the slits to be reinforced while said openings are aligned to provide a flow passage through the stack.

6. The combination according to claim 4 wherein said first opening is disposed to one side of the tooth portion centerline, and wherein said lamination defines a second opening symmetrically spaced an equal distance on the other side of the tooth centerline from the first opening, whereby laminations may be stacked in alternating fashion to cause the slits to be reinforced while said openings are aligned to provide flow passages normal to the laminations.

References Cited in the file of this patent

UNITED STATES PATENTS

| 2,902,611 | Rosenberg | Sept. 1, 1959 |

FOREIGN PATENTS

| 262,808 | Great Britain | Aug. 25, 1927 |
| 318,671 | Great Britain | Sept. 9, 1929 |